Figure 1:
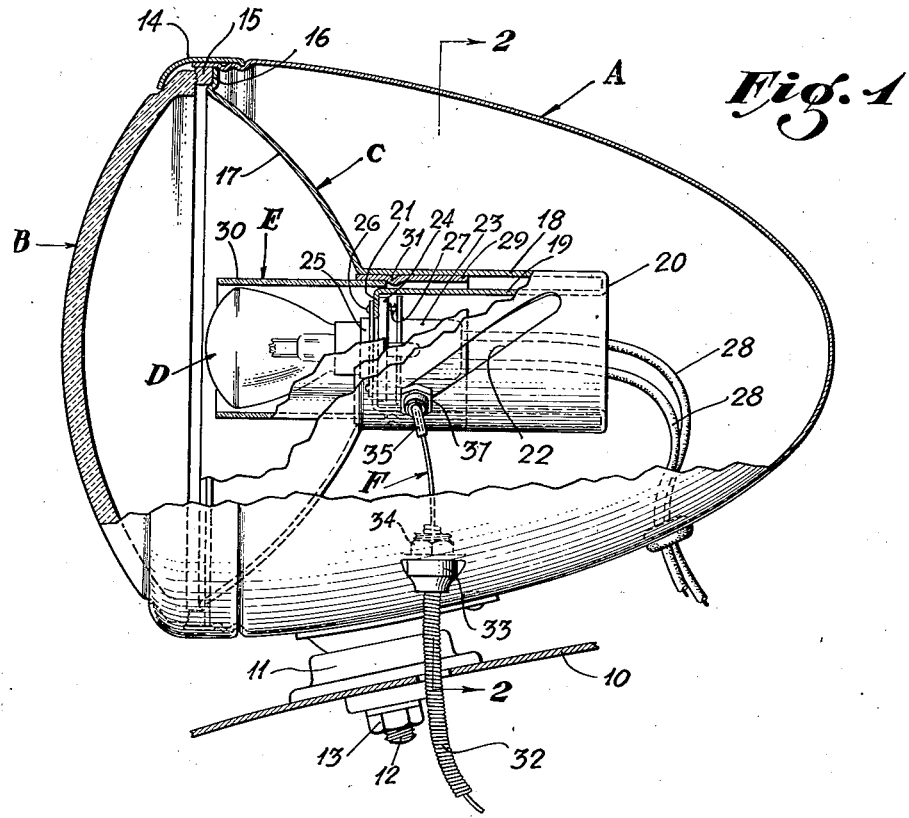

June 4, 1940.  C. SKLAREK  2,202,969
CONVERTIBLE LIGHT
Filed Aug. 13, 1938

CLIFFORD SKLAREK,
INVENTOR;
BY Joseph Harris
ATTORNEY.

Patented June 4, 1940

2,202,969

UNITED STATES PATENT OFFICE 2,202,969

CONVERTIBLE LIGHT

Clifford Sklarek, Los Angeles, Calif.

Application August 13, 1938, Serial No. 224,765

5 Claims. (Cl. 240—45)

This invention relates to improvements in convertible light, and the present application is a continuation in part of the subject matter disclosed in co-pending application No. 140,377, filed May 3, 1937, for improvement in Convertible spot and fog light.

In the operation of automotive vehicles, and more particularly automobiles and trucks, it is highly desirable to have available, in addition to the usual white beam headlights, what are known as fog lights because of the more effective illuminating capacity of the usual fog amber light in foggy weather than that of the usual white light. Heretofore, it has been the general custom to meet this desideratum by employing fog lights which are separate from and independent of the usual headlights with the obvious disadvantages of extra expense, extra equipment and, in many instances, detraction from the appearance of the vehicle.

One object of the present invention is to provide a unitary light for automotive vehicles, which light may be practically instantly converted or adjusted from the usual white light beam projector to either a dimmed or colored light beam projector and vice versa, whereby that type of light beam most desirable, effective and safest at any given time under any particular driving conditions, may be availed of by the operator of the vehicle.

Another object of the invention is to provide a convertible light of the type indicated in the preceding paragraph, wherein the structure is such as to insure and maintain an absolutely fixed focus of the light bulb with respect to the reflector at the time of assembly and application to the car and, more specifically, to form a flat seat for a fixed focus type of bulb, which seat is preferably made integral with the reflector.

Still another object of the invention is to provide a convertible light of the type indicated, wherein the conversion of the light beam from one type to another may be effective by the operator from his usual driving position in the vehicle, as by means of a push and pull wire, the construction being further characterized by the fact that the light beam interceptor or converter of the light is given a combined lengthwise and rotative movement during adjustment to thereby insure both ease of adjustment and retention of the interceptor in its adjusted position without danger of displacement from vibration.

A specific object of the invention is to provide simple actuating means, operable from the instrument board of the vehicle, for adjusting the light interceptor and, more particularly, a freely adjustable connection between the push and pull wire and the interceptor which will positively eliminate binding, kinking, or other difficulty during the adjusting operation.

Other objects of the invention will more clearly appear from the description and claims hereinafter following.

Figure 2:
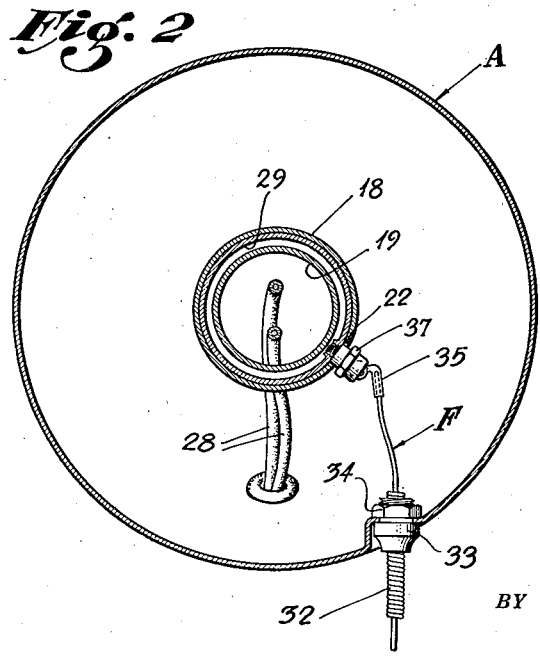
Figure 3:
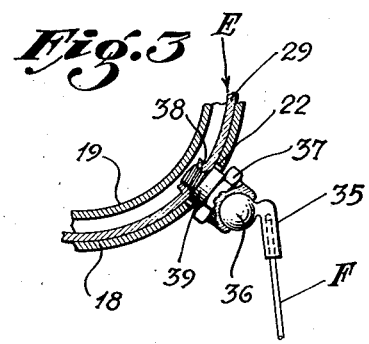

In the drawing forming a part of this specification, Figure 1 is a part vertical, sectional view, part elevational view with portions broken away to better illustrate certain details of construction, of a light embodying the invention. Figure 2 is a vertical, transverse sectional view, corresponding substantially to the section line 2—2 of Figure 1. And Figure 3 is a detail sectional view, upon an enlarged scale, illustrating more particularly the connection between the operating push and pull wire and the light interceptor.

In said drawing, the particular type of light chosen for illustration is that of a headlight for an automobile adapted to be secured to any convenient part thereof, such as the fender, a portion of which is indicated at 10. The light proper comprises, broadly, an outer shell A; the usual lens B; a reflector C; light bulb D; light interceptor E; and push and pull actuating wire F.

The shell A is adapted to be secured to the fender 10 or other portion of the vehicle by any suitable means, such as the bracket 11 indicated conventionally and nut and bolt 12 and 13. The lens B, which shall be of the usual transparent characteristic, is secured to the shell A by suitable means, such as the clamping ring 14 with an annular gasket 15 interposed between the edge of the lens and a peripheral flange 16 formed on the reflector C.

The construction of the reflector C is of primary importance in insuring absolutely fixed focus of the light bulb, while at the same time permitting conversion of the light from one type of emitted light beam to a different kind. To this end, the reflector C is provided with a reflecting portion proper 17, which may be of parabolic or other suitable shape, and a preferably integrally formed and a rearwardly extending section consisting of an outer cylindrical sleeve 18 and a spaced, concentric, inner cylindrical sleeve 19, the sleeves being integrally united by the transverse section indicated at 20. At its front or forward end, the inner sleeve 19 has also integrally formed therewith an inwardly extended annular flange 21, the plane of the flange 21 being slightly inwardly located with reference to the curved surface (if continued) of the reflecting portion 17 of the reflector, all as clearly shown in Figure 1. The outer sleeve 18 has also formed therein a generally longitudinally extending but helical slot 22.

By constructing the reflector C in the manner shown and described, which may be done by suitable die operation, not only may the location of the flange 21 with reference to the focus of the reflecting portion 17 be accurately insured both at the time of manufacture and in assembling of the parts, but also the maintenance thereof in such accurately located position is insured by the unusual rigidity of the entire rearwardly extending section of the reflector C comprised of the two sleeves 18 and 19. As will be apparent, the integral connection 20 at the rear ends of the sleeves 18 and 19, the annular flange 21 at the front end of the sleeve 19 and the junction of the outer sleeve 18 with the reflecting portion 17, provide an extremely rigidified construction which eliminates any possibility of displacement of the flange 21 with reference to the focus of the reflector in a direction axially of the sleeves, and also eliminates any possibility of vibration or displacement transversely of the axes of the sleeves 18 and 19. The same rigidity is important also in connection with the maintenance of the slot 22 in constant position at all times so as to prevent defective operation of the actuating means, as hereinafter described.

The flange 21 provides a fixed seat for a bulb socket base 23, indicated conventionally, and which is secured to said flange 21 by a washer 24, collar 25, screws 26 and interposed springs 27 to permit of the usual bayonet slot type of attachment between the fixed focus type of light bulb D and socket base. As will be appreciated, suitable insulation will be employed to prevent grounding with the flange 21 and the current supply wires 28—28 may obviously be entered through the rear of the sleeve section 18—19 and attached in the usual manner to the base socket 23.

Slidably mounted lengthwise in the space provided between the two sleeves 18 and 19 and preferably guided by the outer sleeve 18, is the light interceptor E which, as shown, preferably consists of a sheet metal tubular section 29 and an outer cylindrical glass section 30, the latter being telescoped within the former and suitably cemented thereto. Preferably, the glass section 30 is limited in its telescoping within the section 29 by the formation of an integral annular bead 31 formed in the section 29. The combined length of the sections 29 and 30 of the light interceptor and the extent of movement provided within the sleeves 18 and 19 are such that, when the light interceptor E is in its outermost position, as shown in Figure 1, the glass section 30 will obviously be in a position to intercept the rays of light from the light bulb D to the portion 17 of the reflector C, and the interceptor E may be retracted so as to permit all of the light rays to pass freely to the reflecting section 17, as will be obvious.

Preferably, the glass section 30 of the interceptor will either be made of colored glass, such as amber if used for driving in fog, or other desired color if the improved light is employed for other purposes. Alternatively, the glass section 30 may be clearly transparent and a suitable color coating applied to one of the surfaces thereof. As will also be apparent to those skilled in the art, the interceptor may be employed for dimming purposes as well as for converting the color of the ultimately emitted light beam from the light.

By employing a clear transparent lens B and a relatively thin light intercepting section 30, a minimum reduction of efficiency of the emitted colored light beam, when the latter is desired, is obviously obtained and one which is far more efficient than now obtainable in the usual type of fog lights wherein the lens corresponding to the lens B of the present invention, is usually of relatively thick amber glass. It is also apparent that the light interceptor E may be adjusted to any intermediate point between either extreme of movement, thus providing for graduated shades between the extreme white light beam and maximum colored light beam.

As hereinbefore indicated, the interceptor E is adapted to be actuated preferably by a push and pull wire F which, by being mounted within a flexible sheathing such as indicated at 32, may be extended to the usual instrument board of the automotive vehicle (not shown) and there actuated by the vehicle operator without leaving his usual driving seat position. The end of the flexible sheathing 32 is secured to the shell A and the wire F entered therethrough by any suitable means, such as the washer 33 and nut 34. Due to the fact that the portion of the actuating wire which is within the shell A must necessarily be free to move both longitudinally and circumferentially of the sleeve section 18—19 and not being confined within a flexible sheathing at this point, it is highly essential that the connection between the actuating wire F and the interceptor E be not only freely adjustable, but such as to positively avoid kinking or binding. To insure this result, the inner end of the wire F has secured thereto a fitting 35 provided with a ball 36 which is received within a corresponding ball socket provided in a bolt head 37. The shank of the bolt is extended through the slot 22 and threaded into a suitably formed threaded female inturned flange 38 on the interceptor section 29. A ring washer 39 is interposed between the nut end of the bolt 37 and the interceptor section 29, said washer acting as a spacer between the nut section of the bolt and tube section 29 and also as an anti-friction bearing in the slot 22 of the sleeve 18. As will be understood, the ball 36 may be retained in place by spinning the nut slightly thereover, as clearly shown in Figure 3.

With the type of connection shown, universal adjustment is provided between the push and pull wire F and the interceptor E and binding between any of the parts positively prevented, thus eliminating possibility of sticking or kinking or other defective operation. The portion of the wire F which is between the nut 34 and fitting 35, as obvious, must flex or bend in a more or less complex manner when actuating the interceptor but regardless of the manner in which said portion flexes, the action will be freely accommodated by the ball and socket connection 36—37. The construction thus employed eliminates those disadvantages which would be inherent in rigid links and ordinary pivot connections.

By employing the helical slot 22, it is apparent that the interceptor E is given a rotative movement as well as an endwise movement, thus not only facilitating ease of adjustment, but providing the means for maintaining the interceptor E in any adjusted position even though subject to the usual vibration incident to vehicle operation.

Although the invention has been shown as applied to the usual head lamp of an automotive vehicle, it will be obvious to those skilled in the art that the improvements may be incorporated in other types of lights such as spot lights, without departing from the spirit of the invention. Further, various changes may be made in details of construction, and all such changes and modifications are contemplated that come within the scope of the appended claims.

What is claimed is:

1. In a convertible light, the combination with a lamp shell having a lens; of a reflector within the shell having a light reflecting portion and an integrally formed section extending rearwardly from the reflector portion centrally of the latter, said formed section consisting of spaced, outer and inner cylindrical sleeves united at their rear ends, the forward end of said inner sleeve having an inturned flange to provide a seat fixed with reference to the focus of the reflecting portion; a bulb socket base supported by and attached to said flange and adapted to have a bulb attached thereto; a tubular, translucent light beam interceptor movably mounted between and lengthwise of said sleeves and outwardly thereof to a position to intercept light rays from the bulb to the reflecting portion, said outer sleeve having a slot therein; and means for actuating said interceptor and engageable with the latter through said slot.

2. In a convertible light, the combination with a lamp shell having a lens; of a reflector having a light reflecting portion and a section rigid therewith and extending rearwardly from the reflector portion centrally of the latter, said section comprising spaced, outer and inner cylindrical sleeves rigidly united at their rear ends, the forward end of said inner sleeve having an inturned flange to provide a seat fixed with reference to the reflecting portion; a bulb socket base supported by and attached to said flange and adapted to receive a fixed focus light bulb; a tubular, light beam interceptor movably mounted between and lengthwise of said sleeves and to a position outwardly thereof to intercept light rays from the bulb to the reflecting portion, said outer sleeve having a slot therein; and means for actuating said interceptor including a push and pull wire extending from the interior of the shell to the exterior thereof, and connecting devices between the end of said wire and the interceptor extending through said sleeve slot, said connecting devices including a universal joint.

3. In a convertible light, the combination with a lamp shell having a lens; of a reflector having a light reflecting portion and an integrally formed section extending rearwardly from the reflecting portion centrally of the latter, said formed section comprising spaced, inner and outer cylindrical sleeves integrally united at their rear ends, the forward end of said inner sleeve having an inturned annular flange to provide a seat fixed with reference to the reflecting portion and focus thereof; a bulb socket base supported by and attached to said flange and adapted for the reception of a light bulb; a translucent, tubular light beam interceptor slidably mounted between and lengthwise of said sleeves, said outer sleeve having a helical slot therein; a push and pull wire for actuating said interceptor operable from the exterior of the shell and extending thereinto; and means connecting the inner end of said wire and interceptor including a ball and socket joint and an element extending through said helical slot.

4. In a convertible light, the combination with a lamp shell having a lens; of a reflector within the shell having a light reflecting portion and a section rigid therewith and extending rearwardly from the reflector portion centrally of the latter, said section consisting of spaced, outer and inner cylindrical sleeves united at their rear ends, the forward end of the inner sleeve having an inturned integral flange to rigidify the section and provide a seat fixed with reference to the focus of the reflecting portion; a bulb socket base supported by and attached to said flange and adapted to have a fixed focus bulb attached thereto; a tubular light beam interceptor movably mounted between and lengthwise of said sleeves and outwardly thereof to a position to intercept the light rays from the bulb to the reflecting portion; and devices for actuating said interceptor including a push and pull wire extending through the shell and means connecting the end of said wire through the outer of said sleeves with the interceptor.

5. In a convertible light, the combination with a lamp shell having a lens; of a reflector within the shell having a reflector portion and means, including a cylindrical sleeve, for retaining a light bulb, said sleeve having a helical slot therein; a tubular light beam interceptor slidably mounted within said sleeve; a push and pull wire for actuating said interceptor, said wire being entered through the shell and having a flexible portion in the space between the shell and said sleeve; and means connecting the inner end of said flexible portion of said wire and interceptor including an element fixed to the interceptor and extending outwardly through said helical slot and a universal joint connection between said element and said inner end of the wire, said element having a combined spacer and anti-friction washer thereon located within the helical slot.

CLIFFORD SKLAREK.